United States Patent [19]

Gronert

[11] 4,024,686
[45] May 24, 1977

[54] ASSEMBLY BUILDING HAVING FLOOR ELEMENTS SUPPORTED BETWEEN SUPERIMPOSED COLUMNS

[76] Inventor: Ronald Gronert, Willem de Rijkelaan 76, Hillegom, Netherlands

[22] Filed: Nov. 21, 1975

[21] Appl. No.: 634,230

[30] Foreign Application Priority Data

Dec. 13, 1974 Netherlands .................... 7416243

[52] U.S. Cl. .................... 52/282; 52/239; 52/497; 52/726; 160/351; 211/182; 211/205; 403/217

[51] Int. Cl.² .................... E04B 5/00

[58] Field of Search ............ 52/282, 65, 754, 497, 52/756, 726, 755, 239; 160/135, 351; 46/28, 27; 211/177, 182, 194, 205; 403/361, 234, 237, 170, 174, 178

[56] References Cited

UNITED STATES PATENTS

| | | | |
|---|---|---|---|
| 2,679,911 | 6/1954 | Bhend | 52/726 X |
| 2,914,190 | 11/1959 | Geddes et al. | 52/726 X |
| 3,104,532 | 9/1963 | Severinsson | 52/726 X |
| 3,132,443 | 5/1964 | Kuhn | 46/28 |
| 3,338,605 | 8/1967 | Stoeber | 403/174 |
| 3,554,384 | 1/1971 | De Natale | 211/194 X |
| 3,559,352 | 2/1971 | Magnuson | 52/65 X |
| 3,636,893 | 1/1972 | Lange | 108/153 X |
| 3,691,709 | 9/1972 | Ostborg | 52/239 |
| 3,762,116 | 10/1973 | Anderson et al. | 52/282 X |
| 3,766,692 | 10/1973 | Stark et al. | 52/239 X |
| 3,809,142 | 5/1974 | Bleeker | 160/135 |
| 3,811,157 | 5/1974 | Schenk | 52/756 |
| 3,851,601 | 12/1974 | Davis | 211/182 |
| 3,895,670 | 7/1975 | Bales et al. | 160/135 |
| 3,912,410 | 10/1975 | Pofferi | 211/182 X |
| 3,936,111 | 2/1976 | Mazzucconi | 211/148 X |

*Primary Examiner*—Leslie Braun
*Attorney, Agent, or Firm*—Ladas, Parry, Von Gehr, Goldsmith & Deschamps

[57] ABSTRACT

Assembly building wherein mounting elements are used, each of said elements having a peripheral recess at the top and a depending hollow skirt portion at the bottom, said hollow skirt portion being defined by an inner shoulder and said recess being defined by an outer top flange on which the inner shoulder of an adjacent mounting element is to be supported so that between two adjacent mounting elements a peripheral gap is formed, through which gap one or more flanged building elements are to be mounted with their flange in said recess. In a preferred embodiment the respective inner shoulder and outer top flange of two adjacent mounting elements are provided with interengaging bayonet joint portions.

3 Claims, 3 Drawing Figures

ASSEMBLY BUILDING HAVING FLOOR ELEMENTS SUPPORTED BETWEEN SUPERIMPOSED COLUMNS

SUMMARY OF THE INVENTION

This invention relates to assembly building by means of mounting elements such as column elements which are to be superposed and have a peripheral recess at the top side for receiving the bottom side of a superposed subsequent column element while leaving a vertical peripheral gap in which an upstanding flanged edge provided at the periphery of a building element such as a floor element which is to be inserted, is to be retained, and a vertical spacing equal to the thickness of the margin of the floor element which is to be received therebetween.

This assembly method provides for a quick and efficient mounting of the building elements such as the floors and columns of a building in stacked relationship.

An important aspect of the present invention is that the column element is provided at the bottom side with an inner shoulder, and at the top side, in the upper part of the peripheral recess, with a projecting shoulder, with said respective shoulders of consecutive column elements abutting when a floor element with its upstanding flanged edge fittingly received under the projecting shoulder, is mounted therebetween.

A further aspect of the invention is that the respective shoulders define bayonet joint edges which provide for a positive retainment of the assembled building elements.

The invention is described more in detail in the following specification with reference to the drawings which show illustrative embodiments thereof.

DESCRIPTION OF THE PREFERRED EMBODIMENTS

Figure 1:
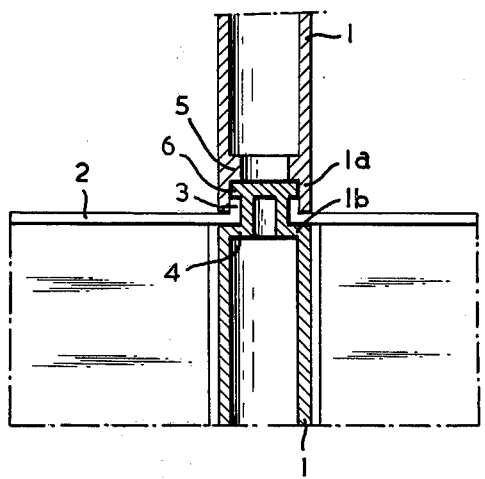
FIG. 1 is a vertical sectional view of a pair of superposed column elements with floor element mounted therebetween.
Figure 2:
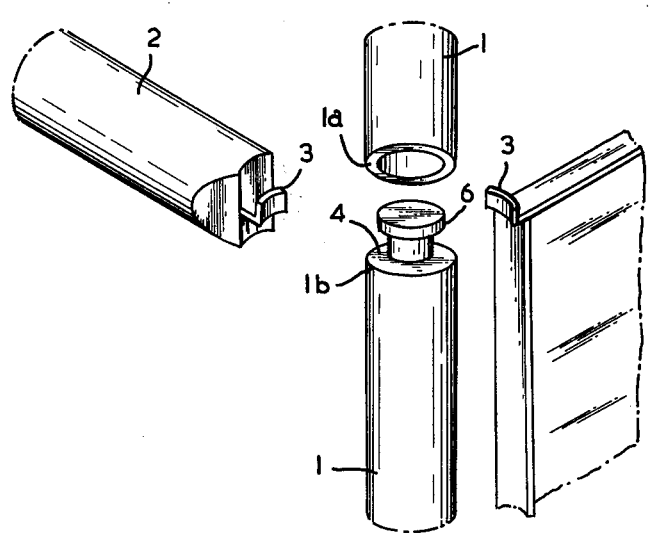
FIG. 2 is an exploded view of the respective building elements.

In the drawings a mounting element such as a column element is indicated with the reference numeral 1. The respective mounting elements are arranged in stacked relation with their bottom side 1a on the top side 1b of a subsequent element while inserting a building element such as a floor element 2 therebetween.

The floor element 2 is provided at its periphery with an upstanding mounting flange 3 which is received in a peripheral recess 4 at the top side 1b of a column element 1 and is then retained by the bottom side 1a of a subsequent column element 1 with said bottom side fittingly mounted therearound.

For a fitting retainment the column element is further at its bottom side 1a provided with an inner shoulder 5, and at its top side 1b, in the upper part of the peripheral recess 4, of a projecting shoulder 6 which is fittingly received in the bottom side 1a of the subsequent element 1.

The upstanding flanged edge 3 of the floor element 2 which is to be inserted between the consecutive column elements 1, is to be fittingly received under the projecting shoulder 6 in the recess 4, and the bottom side 1a of the subsequent column element, which is to be arranged therearound, is then supported on the upper surface of the floor element while the respective shoulders 5 and 6 are also abutting, whereby a properly retained mounting connection between the assembled building elements is obtained.

Figure 3:
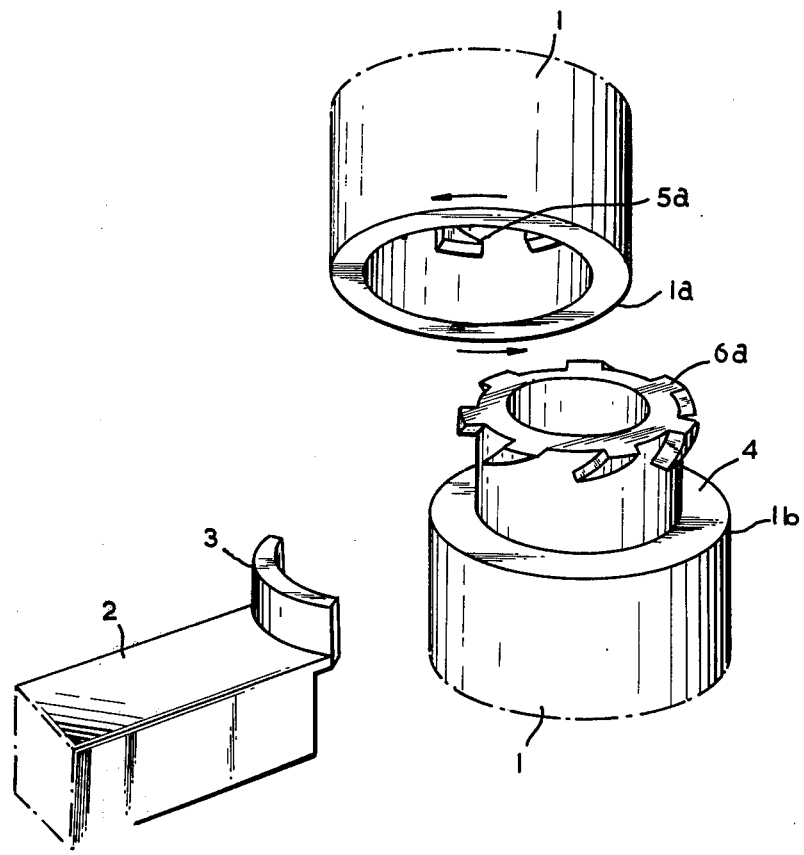
FIG. 3 shows the bayonet joint of the mounting elements.

For a positive retainment of the assembled building elements the respective shoulders are formed as bayonet joint edges 5a and 6a as shown in FIG. 3. After sliding the shoulders 5a, 6a on each other they are then rotated with respect to each other. This provides for a tightly clamped connection. When rotated back the elements are also readily to be released again, however, in the recess 4 under the shoulder 6a further ribs or other embossments (not shown) may be provided for fixing the position of an inserted flange 3 peripherally.

It is pointed out that stress is put here on the releasability of the connection. For permanent connections between prefabricated elements, joints which are cast and set (not shown) could be adapted.

What is claimed is:

1. In an assembly building including column elements which are capable of being superposed and have a recessed top for receiving a hollow bottom of a superposed subsequent column element, and a floor element which is clamped between said superposed column elements, wherein the improvement comprises that said floor element is provided on at least one end with a marginal edge including an upstanding flange which is clamped between said recessed top and said hollow bottom of said column elements, when superposed, in a substantially L-shaped continuous space located therebetween, said superposed column elements being spaced at their outer edges a distance substantially equal to the thickness of the marginal edge of said floor elements and the lower inner surface of said hollow bottom being spaced from said recessed top a distance substantially equal to the thickness of said upstanding flange, said hollow bottom including an inwardly extending shoulder, said recessed top having a nondeformable outwardly projecting shoulder at the top thereof, whereby said inwardly and said outwardly extending shoulders located on respective superposed column elements engage and the upstanding flange of the floor element is clamped under said outwardly projecting shoulder, and said marginal edge and said upstanding flange each being independently clamped within the vertical and horizontal portions of said L-shaped annular space respectively.

2. An assembly building according to claim 1, wherein said floor element is provided with an arcuate upstanding flanged edge whereby a plurality of said floor elements may be angularly disposed about the longitudinal axis of said column elements.

3. In an assembly building including column elements which are capable of being superposed and have a recessed top for receiving a hollow bottom of a superposed subsequent column element, and a floor element which is clamped between said superposed column elements, wherein the improvement comprises that said floor element is provided on at least one end with a marginal edge including an upstanding flange which is clamped between said recessed top and said hollow bottom of said column elements, when superposed, in a substantially L-shaped continuous space located therebetween, said superposed column elements being spaced at their outer edges a distance substantially equal to the thickness of the marginal edge of said floor elements and the lower inner surface of said hollow bottom being spaced from said recessed top a distance substantially equal to the thickness of said upstanding flange, said hollow bottom including an inwardly extending shoulder, said recessed top having a nondeformable outwardly projecting shoulder at the top thereof, whereby said inwardly and said outwardly extending shoulders located on respective superposed column elements engage and the upstanding flange of the floor element is clamped under said outwardly projecting shoulder, said marginal edge and said upstanding flange each being independently clamped within the vertical and horizontal portions of said L-shaped annular space respectively, and said clamping of said marginal edge and said upstanding flange being effected by interengaging bayonet screw connection means provided on said inwardly and said outwardly extending shoulders.

* * * * *